US008503971B2

(12) United States Patent
Overby

(10) Patent No.: US 8,503,971 B2
(45) Date of Patent: Aug. 6, 2013

(54) SYSTEM AND METHOD FOR PROCESSING MEID DATA

(75) Inventor: Terry A. Overby, Garland, TX (US)

(73) Assignee: Brightpoint, Inc., Plainfield, IN (US)

( * ) Notice: Subject to any disclaimer, the term of this patent is extended or adjusted under 35 U.S.C. 154(b) by 984 days.

(21) Appl. No.: 11/465,086

(22) Filed: Aug. 16, 2006

(65) Prior Publication Data
US 2008/0194223 A1 Aug. 14, 2008

Related U.S. Application Data

(60) Provisional application No. 60/595,965, filed on Aug. 20, 2005.

(51) Int. Cl.
H04W 4/22 (2009.01)
H04W 4/24 (2009.01)
H04W 12/06 (2009.01)
H04W 8/26 (2009.01)
H04M 11/04 (2006.01)

(52) U.S. Cl.
USPC ......... 455/404.1; 455/406; 455/411; 455/551

(58) Field of Classification Search
USPC .............................. 455/410, 404.1
See application file for complete search history.

(56) References Cited

U.S. PATENT DOCUMENTS

| 6,947,941 B1* | 9/2005 | Koon | 707/697 |
| 2001/0027117 A1* | 10/2001 | Alanara | 455/551 |
| 2003/0022655 A1* | 1/2003 | Bogat | 455/406 |
| 2004/0034813 A1* | 2/2004 | Chaboud et al. | 714/27 |
| 2006/0154646 A1* | 7/2006 | Tung | 455/411 |

OTHER PUBLICATIONS

Exhibit A—Protest Under 37 CFR 1.291.
http://web.archive.org/web/20020929005215/www.cellularindustry.com/html/esn_tracker.html, Nov. 2002, printed Aug. 22, 2008.
http://www.14digital.com/Tools/Conversion.aspx, 2004, printed Aug. 22, 2008.
http://www.babt.com/gsm-imei-number-allocation.asp, 1997, printed Aug. 22, 2008.
http://www.checkmend.com/us/, 2005, printed Aug. 22, 2008.
http://www.nobbi.com/tacdb.php?searchstring=&sortby=t&lang=1, 1997, printed Aug. 22, 2008.
http://www.numberingplans.com/?page=analysis, 2001, printed Aug. 22, 2008.
http://www.tiaonline.org/standards/resources/esn/codes.cfm, May 1996, printed Aug. 21, 2008.
PHR Streamline program, Phone Coders Corp.

* cited by examiner

Primary Examiner — Timothy Pham
(74) Attorney, Agent, or Firm — Ice Miller LLP

(57) ABSTRACT

A system, method, computer readable medium, and computer program for processing wireless communication device identification numbers such as MEID numbers 10 in any standard representation (such as decimal or hexadecimal) and converting the wireless communication device identification number 140 to all commonly used forms and representations. This capability ensures older systems and wireless networks are compatible with the latest standards in wireless communication device identification numbers. Additionally, the system can validate the wireless communication device identification numbers 70 and verify/calculate any check digits 100.

20 Claims, 14 Drawing Sheets

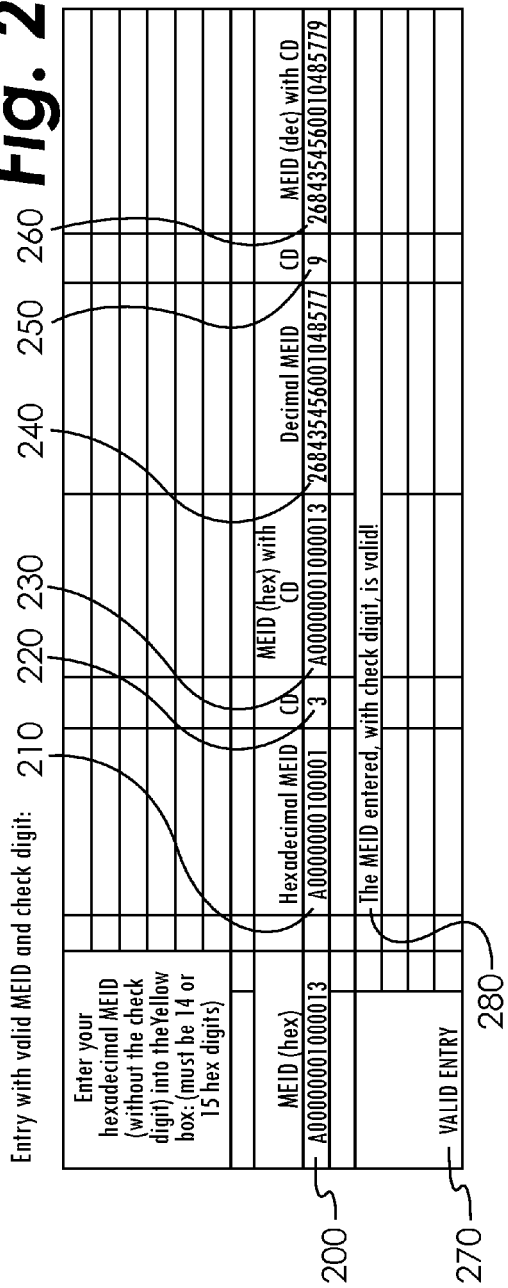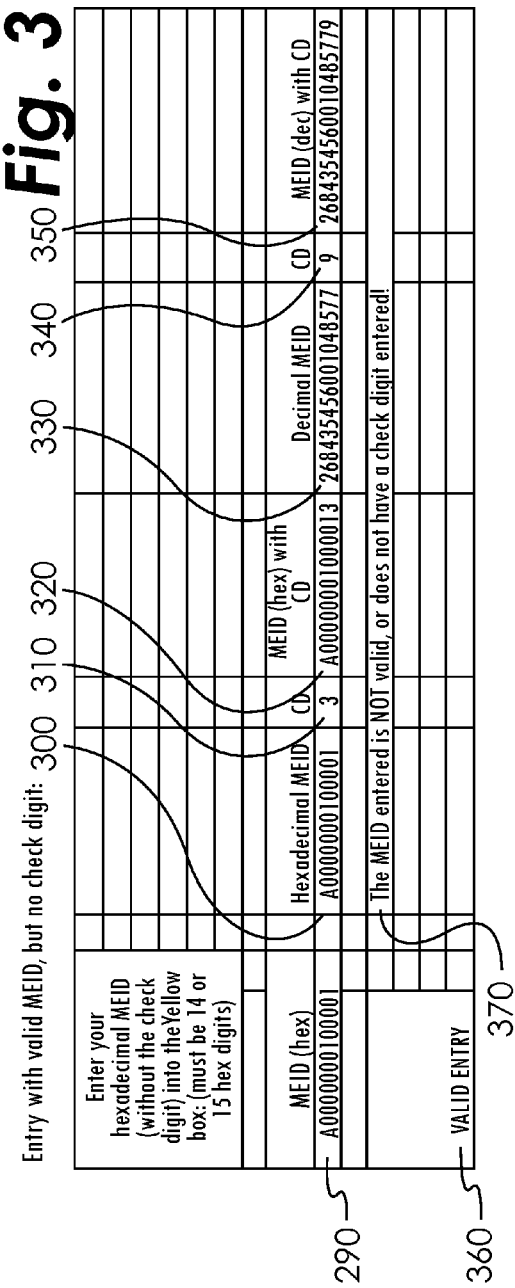

Entry with invalid MEID-too many digits:

| Enter your hexadecimal MEID (without the check digit) into the Yellow box: (must be 14 or 15 hex digits) | | | | | | |
|---|---|---|---|---|---|---|
| MEID (hex) | | Hexadecimal MEID | CD | MEID (hex) with CD | Decimal MEID | CD | MEID (dec) with CD |
| A000000000100000134 | | A0000000100001 | 3 | A00000000100013 | 268435456001048577 | 9 | 2684354560010485779 |
| Not enough or too many digits! | | The MEID entered is NOT valid, or does not have a check digit entered! | | | | | |

380 — MEID (hex) row
390 — Not enough or too many digits
400 — The MEID entered is NOT valid...

*Fig. 4*

Entry with invalid MEID-not enough digits:

| Enter your hexadecimal MEID (without the check digit) into the Yellow box: (must be 14 or 15 hex digits) | | | | | | |
|---|---|---|---|---|---|---|
| MEID (hex) | | Hexadecimal MEID | CD | MEID (hex) with CD | Decimal MEID | CD | MEID (dec) with CD |
| A00000000010000 | | AA0000000010000 | F | AA000000000100000F | 285212672000065536 | 1 | 2852126720000655361 |
| Not enough or too many digits! | | The MEID entered is NOT valid, or does not have a check digit entered! | | | | | |

410 — MEID (hex) row
420 — Not enough or too many digits
430 — The MEID entered is NOT valid...

*Fig. 5*

| | A | B |
|---|---|---|
| 1 | | |
| 2 | | |
| 3 | | |
| 4 | Enter your hexadecimal MEID (without the check digit) into the Yellow box: {must be 14 or 15 | |
| 5 | hex digits} | |
| 6 | | |
| 7 | MEID (hex) | |
| 8 | A0000000100001 | |  ~440
| 9 | | |
| 10 | | |
| 11 | | |
| 12 | | |
| 13 | =IF(AA15,"VALID ENTRY","Not enough or too many digits!") | |
| 14 | | |
| 15 | | |
| 16 | | |
| 17 | | |
| 18 | | |
| 19 | | |
| 20 | | |
| 21 | | |
| 22 | | |
| 23 | | =LEFT(Y39,1) |
| 24 | | =HEX2DEC(B23) | ~450
| 25 | | |
| 26 | | |
| 27 | | |
| 28 | | |
| 29 | | |
| 30 | | |
| 31 | | |
| 32 | | |
| 33 | | |
| 34 | | =DEC2HEX(B24) | ~460
| 35 | | |
| 36 | | |
| 37 | | |
| 38 | | |
| 39 | | |
| 40 | MEID (decimal) | |
| 41 | | |
| 42 | | |
| 43 | | |
| 44 | | |
| 45 | | |
| 46 | | |
| 47 | | |
| 48 | | |
| 49 | | |
| 50 | | |
| 51 | | |
| 52 | | |

MEID Processor

*Fig. 6*

|    | C | D | E |
|----|---|---|---|
| 1  |   |   |   |
| 2  |   |   |   |
| 3  |   |   |   |
| 4  |   |   |   |
| 5  |   |   |   |
| 6  |   |   |   |
| 7  |   |   |   |
| 8  |   |   |   |
| 9  |   |   |   |
| 10 |   |   |   |
| 11 |   |   |   |
| 12 |   |   |   |
| 13 |   |   |   |
| 14 |   |   |   |
| 15 |   |   |   |
| 16 |   |   |   |
| 17 |   |   |   |
| 18 |   |   |   |
| 19 |   |   |   |
| 20 |   |   |   |
| 21 |   |   |   |
| 22 |   |   |   |
| 23 | =LEFT(Y40,1) | =LEFT(Y41,1) | =LEFT(Y42,1) |
| 24 | =HEX2DEC(C23) | =HEX2DEC(D23) | =HEX2DEC(E23) |
| 25 | =SUM(C24+C24) |   | =SUM(E24+E24) |
| 26 | =DEC2HEX(C25) |   | =DEC2HEX(E25) |
| 27 | =CONCATENATE(Z40,C26) |   | =CONCATENATE(Z40,E26) |
| 28 | =RIGHT(C27,2) |   | =RIGHT(E27,2) |
| 29 | =LEFT(C28,1) |   | =LEFT(E28,1) |
| 30 | =RIGHT(C28,1) |   | =RIGHT(E28,1) |
| 31 | =HEX2DEC(C29) |   | =HEX2DEC(E29) |
| 32 | =HEX2DEC(C30) |   | =HEX2DEC(E30) |
| 33 | =SUM(C31:C32) |   | =SUM(E31:E32) |
| 34 | =DEC2HEX(C33) | =DEC2HEX(D24) | =DEC2HEX(E33) |
| 35 |   |   |   |
| 36 |   |   |   |
| 37 |   |   |   |
| 38 |   |   |   |
| 39 |   |   |   |
| 40 |   |   |   |
| 41 | =LEFT(V38,1) | =LEFT(V41,1) | =LEFT(V42,1) |
| 42 |   | =SUM(D41+D41) |   |
| 43 |   | =CONCATENATE(Z40,D42) |   |
| 44 |   | =RIGHT(D43,2) |   |
| 45 | =SUM(C41+0) | =LEFT(D44,1)+RIGHT(D43,1) | =SUM(E41) |
| 46 |   |   |   |
| 47 |   |   |   |
| 48 |   |   |   |
| 49 |   |   |   |
| 50 |   |   |   |
| 51 |   |   |   |
| 52 |   |   |   |

MEID Processor

Fig. 7

|   | F | G | H |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | | | |
| 12 | | | |
| 13 | | | |
| 14 | | | |
| 15 | | | |
| 16 | | | |
| 17 | | | |
| 18 | | | |
| 19 | | | |
| 20 | | Do not change any of the below fields. They all contain formulas and will im | |
| 21 | | | |
| 22 | | | Hexade |
| 23 | =LEFT(Y43,1) | =LEFT(Y44,1) | =LEFT(Y45,1) |
| 24 | =HEX2DEC(F23) | =HEX2DEC(G23) | =HEX2DEC(H23) |
| 25 | | =SUM(G24+G24) | |
| 26 | | =DEC2HEX(G25) | |
| 27 | | =CONCATENATE(Z40,G26) | |
| 28 | | =RIGHT(G27,2) | |
| 29 | | =LEFT(G28,1) | |
| 30 | | =RIGHT(G28,1) | |
| 31 | | =HEX2DEC(G29) | |
| 32 | | =HEX2DEC(G30) | |
| 33 | | =SUM(G31:G32) | |
| 34 | =DEC2HEX(F24) | =DEC2HEX(G33) | =DEC2HEX(H24) |
| 35 | | | |
| 36 | | | |
| 37 | | | |
| 38 | | | |
| 39 | | | |
| 40 | | | |
| 41 | =LEFT(V43,1) | =LEFT(V44,1) | =LEFT(V45,1) |
| 42 | =SUM(F41+F41) | | =SUM(H41+H41) |
| 43 | =CONCATENATE(Z40,F42) | | =CONCATENATE(Z40,H42) |
| 44 | =RIGHT(F43,2) | | =RIGHT(H43,2) |
| 45 | =LEFT(F44,1)+RIGHT(F43,1) | =SUM(G41) | =LEFT(H44,1)+RIGHT(H43,1) |
| 46 | | | |
| 47 | | | |
| 48 | | | |
| 49 | | | |
| 50 | | | |
| 51 | | | |
| 52 | | | |

MEID Processor

*Fig. 8*

|  | I | J | K |
|---|---|---|---|
| 1 |  |  |  |
| 2 |  |  |  |
| 3 |  |  |  |
| 4 |  |  |  |
| 5 |  |  |  |
| 6 |  |  |  |
| 7 |  |  |  |
| 8 |  |  |  |
| 9 |  |  |  |
| 10 |  |  |  |
| 11 |  |  |  |
| 12 |  |  |  |
| 13 |  |  |  |
| 14 |  |  |  |
| 15 |  |  |  |
| 16 |  |  |  |
| 17 |  |  |  |
| 18 |  |  |  |
| 19 |  |  |  |
| 20 | pact this spreadsheet. Do not copy and paste any cells, as this action will have an ad |  |  |
| 21 |  |  |  |
| 22 | cimal MEID |  |  |
| 23 | =LEFT(Y46,1) | =LEFT(Y47,1) | =LEFT(Y48,1) |
| 24 | =HEX2DEC(I23) | =HEX2DEC(J23) | =HEX2DEC(K23) |
| 25 | =SUM(I24+I24) |  | =SUM(K24+K24) |
| 26 | =DEC2HEX(I25) |  | =DEC2HEX(K25) |
| 27 | =CONCATENATE(Z40,I26) |  | =CONCATENATE(Z40,K26) |
| 28 | =RIGHT(I27,2) |  | =RIGHT(K27,2) |
| 29 | =LEFT(I28,1) |  | =LEFT(K28,1) |
| 30 | =RIGHT(I28,1) |  | =RIGHT(K28,1) |
| 31 | =HEX2DEC(I29) |  | =HEX2DEC(K29) |
| 32 | =HEX2DEC(I30) |  | =HEX2DEC(K30) |
| 33 | =SUM(I31:I32) |  | =SUM(K31:K32) |
| 34 | =DEC2HEX(I33) | =DEC2HEX(J24) | =DEC2HEX(K33) |
| 35 |  |  |  |
| 36 |  |  |  |
| 37 |  |  |  |
| 38 |  |  |  |
| 39 |  |  |  |
| 40 |  |  |  |
| 41 | =LEFT(V46,1) | =LEFT(V47,1) | =LEFT(V48,1) |
| 42 |  | =SUM(J41+J41) |  |
| 43 |  | =CONCATENATE(Z40,J42) |  |
| 44 |  | =RIGHT(J43,2) |  |
| 45 | =SUM(I41) | =LEFT(J44,1)+RIGHT(J43,1) | =SUM(K41) |
| 46 |  |  |  |
| 47 |  |  |  |
| 48 |  |  |  |
| 49 |  |  |  |
| 50 |  |  |  |
| 51 |  |  |  |
| 52 |  |  |  |

MEID Processor

*Fig. 9*

| | L | M | N |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | | | |
| 12 | | | |
| 13 | | | |
| 14 | | | |
| 15 | | | |
| 16 | | | |
| 17 | | | |
| 18 | | | |
| 19 | | | |
| 20 | verse effect on the spreadsheet. Thank you | | |
| 21 | | | |
| 22 | | | |
| 23 | =LEFT(Y49,1) | =LEFT(Y50,1) | =LEFT(Y51,1) |
| 24 | =HEX2DEC(L23) | =HEX2DEC(M23) | =HEX2DEC(N23) |
| 25 | | =SUM(M24+M24) | |
| 26 | | =DEC2HEX(M25) | |
| 27 | | =CONCATENATE(Z40,M26) | |
| 28 | | =RIGHT(M27,2) | |
| 29 | | =LEFT(M28,1) | |
| 30 | | =RIGHT(M28,1) | |
| 31 | | =HEX2DEC(M29) | |
| 32 | | =HEX2DEC(M30) | |
| 33 | | =SUM(M31:M32) | |
| 34 | =DEC2HEX(L24) | =DEC2HEX(M33) | =DEC2HEX(N24) |
| 35 | | | |
| 36 | | | |
| 37 | | | |
| 38 | | | |
| 39 | | | |
| 40 | | | |
| 41 | =LEFT(V49,1) | =LEFT(X38,1) | =LEFT(X41,1) |
| 42 | =SUM(L41+L41) | | =SUM(N41+N41) |
| 43 | =CONCATENATE(Z40,L42) | | =CONCATENATE(Z40,N42) |
| 44 | =RIGHT(L43,2) | | =RIGHT(N43,2) |
| 45 | =LEFT(L44,1)+RIGHT(L43,1) | =SUM(M41) | =LEFT(N44,1)+RIGHT(N43,1) |
| 46 | | | |
| 47 | | | |
| 48 | | | |
| 49 | | | |
| 50 | | | |
| 51 | | | |
| 52 | | | |

MEID Processor

Fig. 10

| | O | P | Q | R |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |
| 16 | | | | |
| 17 | | | | |
| 18 | | | | |
| 19 | | | | |
| 20 | | | | |
| 21 | | | | |
| 22 | | | CD | |
| 23 | =LEFT(Y52,1) | =RIGHT(Y38,1) | =DEC2HEX(AA38) | |
| 24 | =HEX2DEC(O23) | =HEX2DEC(P23) | | |
| 25 | =SUM(O24+O24) | | | |
| 26 | =DEC2HEX(O25) | | | |
| 27 | =CONCATENATE(Z40,O26) | | | |
| 28 | =RIGHT(O27,2) | | | |
| 29 | =LEFT(O28,1) | | | |
| 30 | =RIGHT(O28,1) | | | |
| 31 | =HEX2DEC(O29) | | | |
| 32 | =HEX2DEC(O30) | | | |
| 33 | =SUM(O31:O32) | | | |
| 34 | =DEC2HEX(O33) | =DEC2HEX(P24) | | |
| 35 | | | | |
| 36 | | | | |
| 37 | | | | |
| 38 | | | | |
| 39 | | | | |
| 40 | | | | |
| 41 | =LEFT(X42,1) | =LEFT(X43,1) | =LEFT(X44,1) | =LEFT(X45,1) |
| 42 | | =SUM(P41+P41) | | =SUM(R41+R41) |
| 43 | | =CONCATENATE(Z40,P42) | | =CONCATENATE(Z40,R42) |
| 44 | | =RIGHT(P43,2) | | =RIGHT(R43,2) |
| 45 | =SUM(O41) | =LEFT(P44,1)+RIGHT(P43,1) | =SUM(Q41) | =LEFT(R44,1)+RIGHT(R43,1) |
| 46 | | | | =CEILING(S46,10) |
| 47 | | | | |
| 48 | | | | |
| 49 | | | | |
| 50 | | | | |
| 51 | | | | |
| 52 | | | | |

MEID Processor

*Fig. 11*

| | S | T | U |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | | | |
| 12 | | | |
| 13 | | | |
| 14 | | | |
| 15 | | | |
| 16 | | | |
| 17 | | | |
| 18 | | | |
| 19 | | | |
| 20 | | | |
| 21 | | | |
| 22 | | | |
| 23 | | | |
| 24 | | | |
| 25 | | | |
| 26 | | | |
| 27 | | | |
| 28 | | | |
| 29 | | | |
| 30 | | | |
| 31 | | | |
| 32 | | | |
| 33 | | | |
| 34 | | | |
| 35 | | | |
| 36 | | | |
| 37 | | | |
| 38 | | | |
| 39 | | | |
| 40 | | | |
| 41 | =LEFT(X46,1) | =LEFT(X47,1) | =U45 |
| 42 | | =SUM(T41+T41) | |
| 43 | | =CONCATENATE(Z40,T42) | |
| 44 | | =RIGHT(T43,2) | |
| 45 | =SUM(S41) | =LEFT(T44,1)+RIGHT(T43,1) | =SUM(R46-S46) |
| 46 | =SUM(C45:T45) | | |
| 47 | | | |
| 48 | | | |
| 49 | | | |
| 50 | | | |
| 51 | | | |
| 52 | | | |

MEID Processor

*Fig. 12*

| | V |
|---|---|
| 1 | |
| 2 | |
| 3 | |
| 4 | |
| 5 | |
| 6 | |
| 7 | Hexadecimal MEID |
| 8 | =CONCATENATE(B23,C23,D23,E23,F23,G23,H23,I23,J23,K23,L23,M23,N23,O23) |
| 9 | |
| 10 | =IF(MOD(AA18,10)=0,"The MEID entered, with check digit, is valid!","The MEID entered is NOT valid, or does no|
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | |
| 26 | |
| 27 | |
| 28 | |
| 29 | |
| 30 | |
| 31 | |
| 32 | |
| 33 | |
| 34 | |
| 35 | |
| 36 | |
| 37 | |
| 38 | =RIGHT(V39,10) |
| 39 | =CONCATENATE(Z40,V40) |
| 40 | =SUM(X23) |
| 41 | =RIGHT(V40,9) |
| 42 | =RIGHT(V40,8) |
| 43 | =RIGHT(V40,7) |
| 44 | =RIGHT(V43,6) |
| 45 | =RIGHT(V44,5) |
| 46 | =RIGHT(V45,4) |
| 47 | =RIGHT(V46,3) |
| 48 | =RIGHT(V47,2) |
| 49 | =RIGHT(V48,1) |
| 50 | |
| 51 | |
| 52 | |

MEID Processor

Fig. 13

|    | W | X |
|----|---|---|
| 1  |   |   |
| 2  |   |   |
| 3  |   |   |
| 4  |   |   |
| 5  |   |   |
| 6  |   |   |
| 7  | CD | MEID (hex) with CD |
| 8  | =DEC2HEX(AA38) | =CONCATENATE(V8,W8) |
| 9  |   |   |
| 10 |   |   |
| 11 |   |   |
| 12 |   |   |
| 13 |   |   |
| 14 |   |   |
| 15 |   |   |
| 16 |   |   |
| 17 |   |   |
| 18 |   |   |
| 19 |   |   |
| 20 |   |   |
| 21 |   |   |
| 22 |   |   |
| 23 |   | =SUM(X26:X33) |
| 24 |   |   |
| 25 |   |   |
| 26 |   | =HEX2DEC(B23)*16^7 |
| 27 |   | =HEX2DEC(C23)*16^6 |
| 28 |   | =HEX2DEC(D23)*16^5 |
| 29 |   | =HEX2DEC(E23)*16^4 |
| 30 |   | =HEX2DEC(F23)*16^3 |
| 31 |   | =HEX2DEC(G23)*16^2 |
| 32 |   | =HEX2DEC(H23)*16 |
| 33 |   | =HEX2DEC(I23) |
| 34 |   | =SUM(X26:X33) |
| 35 |   |   |
| 36 |   |   |
| 37 |   |   |
| 38 |   | =RIGHT(X39,8) |
| 39 |   | =CONCATENATE(Z40,Z40,Z40,Z40,Z40,Z40,Z40,Z40,X40) |
| 40 |   | =(Y23) |
| 41 |   | =RIGHT(X39,7) |
| 42 |   | =RIGHT(X41,6) |
| 43 |   | =RIGHT(X42,5) |
| 44 |   | =RIGHT(X43,4) |
| 45 |   | =RIGHT(X44,3) |
| 46 |   | =RIGHT(X45,2) |
| 47 |   | =RIGHT(X46,1) |
| 48 |   |   |
| 49 |   |   |
| 50 |   |   |
| 51 |   |   |
| 52 |   |   |

MEID Processor

*Fig. 14*

| | Y |
|---|---|
| 1 | |
| 2 | |
| 3 | |
| 4 | |
| 5 | |
| 6 | |
| 7 | Decimal MEID) |
| 8 | =CONCATENATE(C41,D41,E41,F41,G41,H41,I41,J41,K41,L41,M41,N41,O41,P41,Q41,R41,S41,T41) |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | Decimal MEID |
| 23 | =SUM(Y26:Y31) |
| 24 | |
| 25 | |
| 26 | =HEX2DEC(J23)*16^5 |
| 27 | =HEX2DEC(K23)*16^4 |
| 28 | =HEX2DEC(L23)*16^3 |
| 29 | =HEX2DEC(M23)*16^2 |
| 30 | =HEX2DEC(N23)*16 |
| 31 | =HEX2DEC(O23) |
| 32 | |
| 33 | |
| 34 | =SUM(Y26:Y31) |
| 35 | |
| 36 | |
| 37 | |
| 38 | =(A8) |
| 39 | =LEFT(Y38,14) |
| 40 | =RIGHT(Y39,13) |
| 41 | =RIGHT(Y40,12) |
| 42 | =RIGHT(Y41,11) |
| 43 | =RIGHT(Y42,10) |
| 44 | =RIGHT(Y43,9) |
| 45 | =RIGHT(Y44,8) |
| 46 | =RIGHT(Y45,7) |
| 47 | =RIGHT(Y46,6) |
| 48 | =RIGHT(Y47,5) |
| 49 | =RIGHT(Y48,4) |
| 50 | =RIGHT(Y49,3) |
| 51 | =RIGHT(Y50,2) |
| 52 | =RIGHT(Y51,1) |

MEID Processor

Fig. 15

| | Z | AA |
|---|---|---|
| 1 | | |
| 2 | | |
| 3 | | |
| 4 | | |
| 5 | | |
| 6 | | |
| 7 | CD | MEID (dec) with CD |
| 8 | =(U41) | =CONCATENATE(Y8,Z8) |
| 9 | | |
| 10 | | |
| 11 | | |
| 12 | | |
| 13 | | |
| 14 | | |
| 15 | | =OR(AA17=0,AA17=1) |
| 16 | | =LEN(A8) |
| 17 | | =SUM(AA16-14) |
| 18 | | =SUM(AA19-AA20) |
| 19 | | =CEILING(AA20,16) |
| 20 | | =SUM(AA21:AA35) |
| 21 | | =HEX2DEC(P34) |
| 22 | CD | =HEX2DEC(B34) |
| 23 | =(U41) | =HEX2DEC(C34) |
| 24 | | =HEX2DEC(D34) |
| 25 | | =HEX2DEC(E34) |
| 26 | | =HEX2DEC(F34) |
| 27 | | =HEX2DEC(G34) |
| 28 | | =HEX2DEC(H34) |
| 29 | | =HEX2DEC(I34) |
| 30 | | =HEX2DEC(J34) |
| 31 | | =HEX2DEC(K34) |
| 32 | | =HEX2DEC(L34) |
| 33 | | =HEX2DEC(M34) |
| 34 | | =HEX2DEC(N34) |
| 35 | | =HEX2DEC(O34) |
| 36 | =DEC2HEX(AA36) | =SUM(AA22:AA35) |
| 37 | =DEC2HEX(AA37) | =CEILING(AA38,16) |
| 38 | | =SUM(AA37-AA36) |
| 39 | | |
| 40 | 0 | |
| 41 | | |
| 42 | | |
| 43 | | |
| 44 | | |
| 45 | | |
| 46 | | |
| 47 | | |
| 48 | | |
| 49 | | |
| 50 | | |
| 51 | | |
| 52 | | |

MEID Processor

*Fig. 16*

SYSTEM AND METHOD FOR PROCESSING MEID DATA

CROSS REFERENCE TO RELATED APPLICATION

This application claims the benefit of co-pending U.S. Ser. No. 60/595,965, Aug. 20, 2005.

BACKGROUND

By means of example only, wireless communication devices have traditionally used electronic serial numbers (ESN) and/or mobile identification numbers (MIN) to identify the communication device to the towers receiving and relaying the communications. As wireless communication device usage (including mobile telephones, wireless data devices, wireless email devices, and any other device using a wireless network) increases, the number of unique ESN and/or MIN numbers that have never been issued diminishes. Eventually, there will be no more available numbers to be issued.

With mobile communication equipment companies running out of traditional ESN numbers and having to adopt new standards, many problems develop within their existing infrastructure and support systems. One such problem is how to utilize the new identification numbers within old computer and management systems. The problem arises for any company involved in the wireless communication industry when these new numbers are used in old software and/or management systems to have wireless communication devices operating on the wireless network.

For example, an old system may require only decimal numbers, but only a hexadecimal ESN number is available. Or, the system may need to convert several types of numbers, and different software may be required for each type of conversion. This creates a major problem for employees trying to activate wireless communication devices on the network because of the complicated nature of converting numbers such as the mobile equipment identifier (MEID) between its various forms.

The following references and other references mentioned in this application contain background information and are hereby incorporated by reference as if included herein in their entirety for the purpose of US patent practice and other jurisdictions where permitted as if set out fully herein: TIA website: http://www tiaoline.org; 3GPP2 website: http://www.3gpp2.org; http://en.wikipedia.org/wiki/Luhn_formula; TIA—MEID Standards Update, version 1.7, published by the TIA, dated August 2004; TIA—MEID Overview, version 1.3, published by the TIA, dated January 2005; TS 122 016, version 5.0.0, published by ETSI, dated June 2002; TS 23.003, version 3.10.0, published by 3GPP, dated June 2002; S.R0048-A, version 1.2.0, published by 3GPP2, dated April 2004; X.P0008-0 v2.0, version 2.0, published by 3GPP2, dated May 2005; TIA-928, published by TIA, dated August 2004; TIA-928-1 Addendum Summary, new annex for TIA-928, undated; ESNGuidelinsV18a, version 1.8a, published by TIA, dated September 2003; SC.R4002.0, version 2.0, published by 3GPP2, dated October 2004; N.S0005-01, version 1.0, published by 3GPP2, undated.

There remains in the field a need for a system, method, computer readable medium, and computer program for processing wireless communication device identification numbers such as MEID numbers in any standard representation (such as decimal or hexadecimal) and converting the wireless communication device identification number to all commonly used forms and representations. This capability would ensure older systems and wireless networks are compatible with the latest standards in wireless communication device identification numbers. Additionally, the system would desirably also simultaneously validate the wireless communication device identification numbers and verify/calculate any check digits.

SUMMARY OF THE INVENTION

The present invention provides a method, computer program, computer readable medium, and a system for converting numbers such as MEID between its various forms for use in other systems that do not support the provided form of MEID. Additionally, the invention can generate pseudo electronic serial numbers (pESN) for systems that do not support the use of MEID. Further, the invention can generate a variety of conversions in a single package so that multiple conversion programs are not needed.

The invention can be provided as a stand alone converter or calculator or may be integrated into other software packages to automate the process. For example, the system may be integrated with an existing system that requires a hexadecimal MEID but all MEID numbers are provided via bar code in the decimal form. The invention can act to convert the scanned decimal MEID to its hexadecimal form and validate the number before providing the hexadecimal MEID to an additional component of the system.

The output providing the converted data can be of any form known in the art including software transmission, software link, analog electric signal, digital electric signal, TCP/IP, XML, computer monitor, handheld display screen, printer, or any other common digital or analog protocol. This list is meant to be only a sample and not include all possible means of transmission.

Certain embodiments of this invention provide methods of validating and converting wireless communication device identification numbers. They can include receiving a wireless communication device identification number; converting the wireless communication device identification number to an equivalent representation and transmitting the equivalent representation.

The wireless communication device identification number can be received from a bar code scanner. The transmitting of the equivalent representation can be via display screen, electronic link, or the like and combinations thereof.

Other embodiments provide systems for validating and converting wireless communication device identification numbers. They can include means for receiving a wireless communication device identification number, means for converting the wireless communication device identification number to an equivalent representation, means for validating the wireless communication device identification number and its equivalent representation and means for communicating the equivalent representation.

The system can include a keypad to input a wireless communication identification number. The system can include a software link, a display screen, and the like or a combination thereof to transmit the equivalent representation.

Some embodiments provide a computer readable medium that can include a set of instructions capable of being executed by a computer. The set of instructions can include instructions for receiving a wireless communication device identification number, instructions for validating the wireless communication device identification number, instructions for converting the wireless communication device identification number into an equivalent representation and instructions for outputting the equivalent representation of the wireless communication device identification number.

The wireless communication device identification number can be in hexadecimal format. The equivalent representation of the wireless communication device identification number can be in decimal format. The output of the equivalent representation of the wireless communication identification number can be to a display screen, and can be via a software link.

Other embodiments provide a computer program that can include a set of instructions capable of being executed by a computer. The instruction set can include instructions for receiving a wireless communication device identification number, validating the wireless communication device identification number, converting the wireless communication device identification number into an equivalent representation, and transmitting the equivalent representation of the wireless communication device identification number.

The wireless communication device identification number can be in hexadecimal format. The equivalent representation of the wireless communication device identification number can be in decimal format. The output of the equivalent representation of the wireless communication identification number can be to a display screen, and can be via a software link.

BRIEF DESCRIPTION OF THE DRAWINGS

FIG. 2 depicts a hexadecimal to decimal MEID result in a spreadsheet display screen when both a valid hexadecimal MEID and a check digit have been entered, according to one embodiment of the present invention.

FIG. 3 depicts a hexadecimal to decimal MEID result in a spreadsheet display screen when a valid hexadecimal MEID has been entered but with no check digit, according to one embodiment of the present invention.

FIG. 4 depicts a hexadecimal to decimal MEID result in a spreadsheet display screen when a MEID that has too many digits (and is thus invalid) has been entered, according to one embodiment of the present invention.

FIG. 5 depicts a hexadecimal to decimal MEID result in a spreadsheet display screen when a MEID that has too few digits (and is thus invalid) has been entered, according to one embodiment of the present invention.

FIG. 6 depicts columns A and B of a spreadsheet with formulas for performing necessary validations and conversions according to one embodiment of the present invention.

FIG. 7 depicts columns C, D and E of the spreadsheet of FIG. 6.

FIG. 8 depicts columns F, G and H of the spreadsheet of FIG. 6.

FIG. 9 depicts columns I, J and K of the spreadsheet of FIG. 6.

FIG. 10 depicts columns L, M and N of the spreadsheet of FIG. 6.

FIG. 11 depicts columns O, P, Q and R of the spreadsheet of FIG. 6.

FIG. 12 depicts columns S, T and U of the spreadsheet of FIG. 6.

FIG. 13 depicts column V of the spreadsheet of FIG. 6.

FIG. 14 depicts columns W and X of the spreadsheet of FIG. 6.

FIG. 15 depicts column Y of the spreadsheet of FIG. 6.

FIG. 16 depicts columns Z and AA of the spreadsheet of FIG. 6.

DETAILED DESCRIPTION

Figure 1:
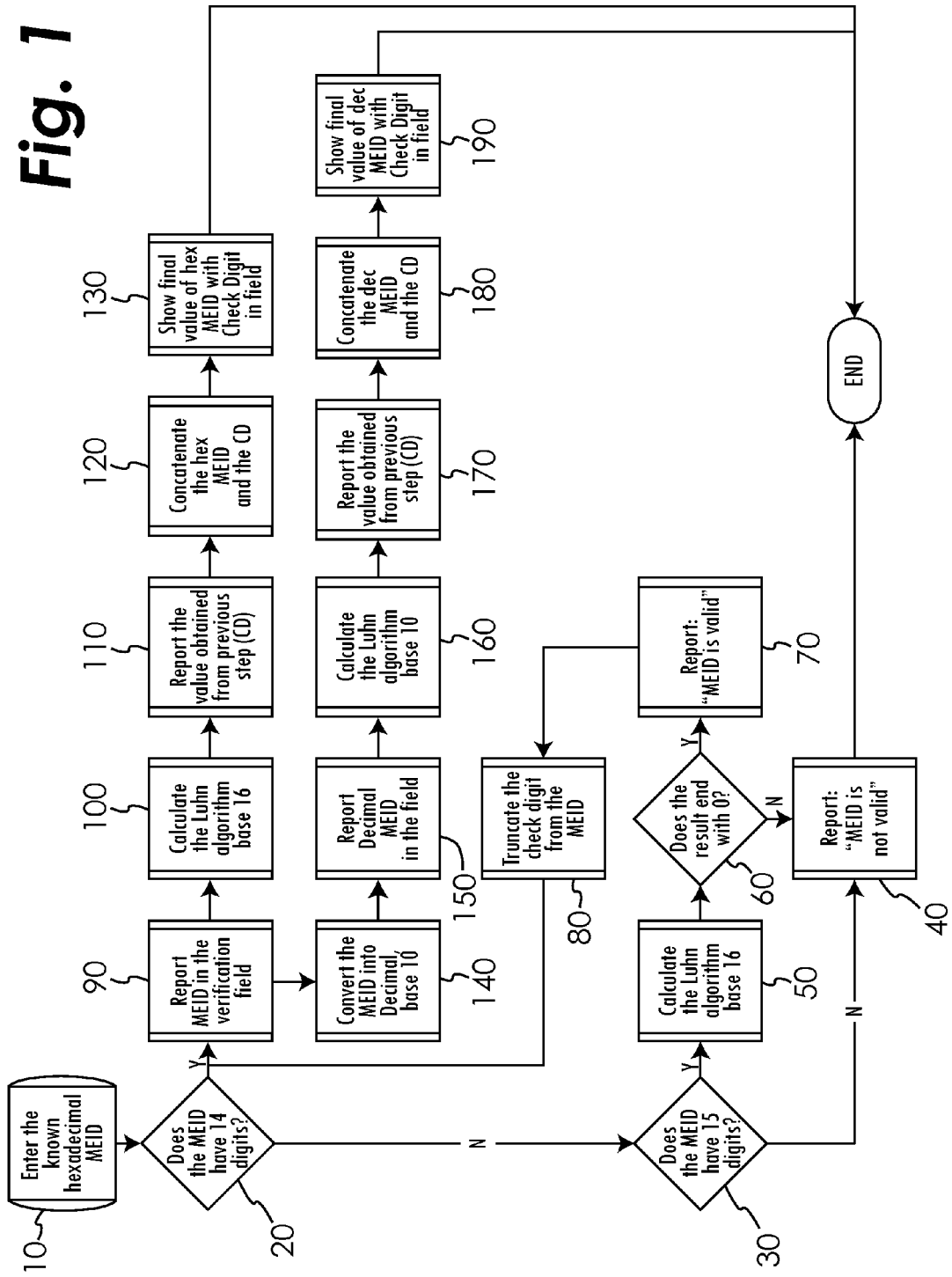
FIG. 1 is a flowchart of a hexadecimal to decimal MEID process according to one embodiment of the invention.

The following acronyms and terms will be used in this document:
3GPP=3$^{rd}$ Generation Partnership Project
3GPP2=3$^{rd}$ Generation Partnership Project 2
ESN=Electronic Serial Number
ETSI=European Telecommunications Standards Institute
GHA=Global Hexadecimal Administrator
GSM=Global System for Mobile communications
IMEI=International Mobile Equipment Identity
MEID=Mobile Equipment Identifier
pESN=pseudo Electronic Serial Number
TIA=Telecommunications Industry Association
SNR=Serial Number
Algorithm: A precise rule (or set of rules) specifying how to solve some problem.
Bit: A fundamental unit of information having just two possible values, as either of the binary digits 0 or 1.
Concatenate: To connect or link in a series or chain; to arrange (strings of characters) into a chained list.
Decimal: Of or pertaining to a number system having 10 as its base.
Hexadecimal: Of or pertaining to a number system having 16 as its base.
Luhn: the algorithm developed by Hans Peter Luhn (1896-1964) that is commonly known as "Mod 10".
Pseudo: (often used as a prefix) not genuine but having the appearance of, e.g. "pseudo-ESN": a number derived from the hexadecimal MEID having characteristics similar to an ESN and used in place of the ESN.

All cellular transceivers have a unique serial number that identifies the specific unit and manufacturer. The serial number is better known as the electronic serial number (ESN) of the device. The ESN is expressed in two ways mathematically, decimal (base 10) and hexadecimal (base 16). Both numbers have the same value, just a different way of noting them.

However, the number of available ESN's is limited, and the current supply is running out. The Telecommunications Industry Association (TIA), together with industry leaders recognized this problem and promulgated a new method to assign serial numbers to cellular devices. This new type of ID number is called the mobile equipment identifier (MEID). The MEID serves the same basic purpose of an ESN and/or mobile identification number (MIN), that is, to identify wireless communication devices on the network, but the MEID is a different format of number. The MEID is used to calculate a pseudo electronic serial number (pESN) in hexadecimal for the handset. Still, the ESN and MEID are very similar in form and function.

The international mobile equipment identity (IMEI) is used in the Global System for Mobile Communications (GSM) technology. The IMEI will be a 14 digit decimal number, and is not converted into hexadecimal. It should not be confused with the MEID. They look the same, but the MEID must have at least 1 alpha character from the set of (A, B, . . . F), while the IMEI will never have any letters in the number. Furthermore, the MEID is hexadecimal and has no check digit.

When the MEID is not available (i.e. network being upgraded), the pESN is used by the cellular network to identify a cellular transceiver over the air. The pESN will be hexadecimal and will be the same format as a hexadecimal ESN. The pESN will always begin with hexadecimal "80".

The ESN is comprised of a of a 32 bit word. The first 8 bits are the manufacturer identification and the remaining 24 bits are the unit serial number. To obtain the value of the 32 bit word, you need to take each string of four bits and convert it to its hexadecimal equivalent.

Hexadecimal digits are an element from the set of (0, 1 . . . , 9, A, B, . . . , F). A hexadecimal digit is a representation of a four bit string. As an example: 0000 0010 1010 0011 0100 1100 1000 0000=05A34C80 (hexadecimal).

The left of the number is padded with zeros to create enough decimal places to complete the decimal number. The first part is always 3 digits, and the last part is always 8 digits. As an example:
1. Hexadecimal ESN=05A34C80
2. Take the first 2 digits and convert them . . . .
3. 05 hex is equal to 005 decimal. (note the padding of 2 zeros to the left).
4. Take the last 6 digits and convert them . . . .
5. A34C80 hex is equal to 10701952 decimal.
6. Concatenate the first 3 decimal digits in front of the last 8 decimal digits.
7. Repeating this procedure, it is seen that 00510701952 is the 11 digit decimal ESN.

The ESN rules for hexadecimal numbers include the following:
1. The ESN is always eight (8) hexadecimal digits long.
2. The first two (2) hexadecimal digits will be the manufacturer identifier. There is an exception for ESN's from Japan, which will have the manufacturer code at the end of the ESN.
3. The last six (6) hexadecimal digits will be the unit serial number.
4. The maximum value of the hexadecimal manufacturer identifier is "FF".
5. The maximum hexadecimal manufacturer identifier that is allowed is "FE".
6. The maximum allowed value hexadecimal serial number is "FFFFFF".

The ESN rules for decimal numbers include the following:
1. The ESN is always eleven (11) decimal digits long.
2. The first three (3) decimal digits will be the manufacturer identifier.
3. The last eight (8) decimal digits will be the unit serial number.
4. The maximum value of the decimal manufacturer identifier is "255".
5. The maximum decimal manufacturer identifier that is allowed is "254".
6. The maximum allowed value decimal serial number is "16777215".

The ESN number format of hexadecimal numbers is represented as an eight-digit alpha numeric number with the following format:

| MFG | | Serial Number | | | | | |
|---|---|---|---|---|---|---|---|
| M | M | S | S | S | S | S | S | wherein MM has a valid range from 01 to FF and a maximum allowed value of FE, and SSSSSS has a valid range from 000000 to FFFFFF and a maximum allowed value of FFFFFF.

The ESN number format for decimal numbers is represented as an 11-digit number with the following format:

| MFG | | | Serial Number | | | | | | |
|---|---|---|---|---|---|---|---|---|---|
| M | M | M | S | S | S | S | S | S | S | wherein MMM has a valid range from 001 to 2255 and a maximum allowed value of 254, and SSSSSSSS has a valid range from 000001 to 16777215 and a maximum allowed value of 16777215.

The MEID is a string of 14 hexadecimal digits and is comprised of a 56 bit word. The first 8 bits are reserved by TIA, the next 24 bits are the manufacturer identification, and the remaining 24 bits are the unit serial number. To obtain the value of the 56 bit word, one needs to take each string of four bits and convert it to its hexadecimal equivalent. As an Example: 1010 1010 0000 0000 1010 0010 0011 1011 0001 1011 0011 1101 0101 0110=AA00A23B1B3D56 (hexadecimal).

The left of the number must be padded with zeros to create enough decimal places to complete the decimal number. The first part will always be 10 digits, and the last part will always be 8 digits. As an example, for hexadecimal MEID=AA00A23B1B3D56:
1. Take the first 8 digits and convert them . . . .
2. AA00A23B hex is equal to 2852168251 decimal.
3. Take the last 6 digits and convert them . . . .
4. 1B3D56 hex is equal to 01785174 decimal (note the padding of 1 zero to the left).
5. Concatenate the first 10 decimal digits in front of the last 8 decimal digits.
6. 285216825101785174 is the 18-digit decimal MEID.

MEID rules for hexadecimal numbers include the following:
1. The MEID is always fourteen 14 hexadecimal digits long plus one (1) check digit.
2. The first two (2) hexadecimal digits are assigned by the Global Hexadecimal MEID Administrator (GHA).
3. The next six (6) hexadecimal digits are the manufacturer identifier.
4. The next six (6) hexadecimal digits will be the unit serial number.
5. The last one (1) hexadecimal digit is the Check Digit, which is not transmitted nor used in any of the conversion calculations.
6. The value of the GHA hexadecimal digits is "A0" through "FF".
7. The maximum value of the hexadecimal manufacturer identifier is "FFFFFF".
8. The maximum hexadecimal manufacturer identifier that is allowed is "FFFFFE".
9. The maximum allowed value hexadecimal serial number is "FFFFFF".
10. The check digit is one of the hexadecimal digits 0-F.

The distribution of the manufacturer identifier field may be dependent on the number of administration bodies. In the case of a small number of global administration bodies, the entire manufacturer identifier field may be allocated to identify a mobile manufacturer. In the case of a large number of regional administration bodies, the manufacturer identifier field may be distributed to indicate the regional administration body and the mobile manufacturer, for example MMMM, MM.

MEID rules for decimal numbers include the following:
1. The MEID is always eighteen (18) decimal digits long plus one (1) check digit.
2. The first ten (10) decimal digits will be the manufacturer identifier.
3. The last eight (8) decimal digits will be the unit serial number.
4. The maximum value of the decimal manufacturer identifier is "4294967295".
5. The maximum decimal manufacturer identifier that is allowed is "4278190078".
6. The maximum allowed value decimal serial number is "16777215".
7. The check digit will be one of decimal digits 0-9.

The hexadecimal MEID number format has the appearance of a 14-digit hexadecimal number with the following format:

| Reserved | | Manufacturer | | | | | Serial Number | | | | | | CD |
|---|---|---|---|---|---|---|---|---|---|---|---|---|---|
| R | R | M | M | M | M | M | S | S | S | S | S | S | C | wherein RR has a valid range from A0 to FF and a maximum allowed value of FE, MMMMMM has a maximum allowed value of FFFFFE, SSSSSS has a valid range from 000000 to FFFFFF and a maximum allowed value of FFFFFF, and the check digit valid range is 0-F.

The decimal MEID number format can have the appearance of an 18-digit decimal number with the following format:

| | | Manufacturer | | | | | | Serial Number | | | | | | | | CD |
|---|---|---|---|---|---|---|---|---|---|---|---|---|---|---|---|---|
| R | R | M | M | M | M | M | M | M | S | S | S | S | S | S | S | C | wherein RR and MMMMMM are used together as one number for the conversion, RRMMMMMMMM has a valid range from 2684354560 to 4294967295 and a maximum allowed value of 4278190078, SSSSSSSS has a valid range from 00000001 to 16777215 and a maximum allowed value of 16777215, and the check digit valid range is 0-9.

The check digit is appended to the end of the MEID, in both decimal and hexadecimal formats. The check digit is not transmitted, nor used in any other calculations.

The Check Digit (CD) is calculated using the "Luhn algorithm'. The Luhn algorithm, also known as the "modulus 10" or "mod 10" algorithm, was developed in the 1960s as a method of validating identification numbers. Much of its notoriety comes from its adoption by credit card companies shortly after its creation in the late 1960s by IBM scientist Hans Peter Luhn (1896-1964). It is not intended to be a cryptographically secure hash function, but it is used to protect against random error.

The Luhn formula generates a check digit, which is usually appended to the end of a number to generate the full number. This number must pass the following algorithm (and the check digit chosen and placed so that the full number will pass). The following is an example of determining the correct check digit when it is unknown: Starting with the last digit and moving left, double the value of all the alternating digits. For any sum that has 2 digits, add the digits together. For example, 2121 becomes 2222, while 3857 becomes 3755 (from 3+(1+6)+5+(1+4)). Add all these digits together. For example, 2121 becomes 2222, then 2+2+2+2 is 8; while 3857 becomes 3755, then 3+7+5+5 is 20. So, 2121 is not valid (as previously shown, it comes out to 8) so the value of the check digit is calculated by subtracting the sum of the numbers from the sum of the numbers rounded to the next highest denominator of 10. In this case the sum is equal to 8, and the next highest rounded denominator of 8 is 10. Eight from 10 is equal to 2. The check digit for 2121 will be 2, and the 2 should be placed to the right of the full beginning number. So 2121 becomes 21212 with its check digit in place. 3857 adds up to 20, and 20 ends with a 0. The check digit for 3857 will be 0, and the 0 should be placed to the right of the full beginning number. So 3857 becomes 38570 with its check digit in place.

In the world of MEID, the Luhn Algorithm is modified to operate in base 16 (hexadecimal). The difference is that the final digit will be hexadecimal from the set of (0, 1 . . . , 9, A, B, . . . , F). The number must pass the following algorithm (and the check digit chosen and placed so that the full number will pass). The following is an example of determining the correct check digit when it is unknown: Starting with the last digit and moving left, double the value of all the alternating digits. For any sum that has 2 digits, add the digits together. For example, 2E1A becomes 2D16 (from 2+(I+C)+I+(I+4)) while AB17 becomes A71E (from (A+(1+6)+1+E). Add all these digits together. For example, 2E1A becomes 2D16, then 2+D+1+6 is 16; while AB17 becomes A71E, then A+7+1+E is 20. So, 2E1A is not valid (as previously shown, it comes out to 16) so the check digit is calculated by subtracting the sum of the numbers from the sum of the numbers rounded to the next highest denominator of 16 (0x10). In this case the sum is equal to 16, and the next highest rounded denominator of 16 (0x10) of 16 is 20. So 16 from 20 is equal to A (this is all in hexadecimal). The check digit for 2E1A will be A, and the A should be placed to the right of the full beginning number. So 2E1A becomes 2E1AA with its check digit in place. While AB17 adds up to 20, and 20 ends with a 0. The check digit for AB17 will be 0, and the 0 should be placed to the right of the full beginning number. So AB17 becomes AB170 with its check digit in place.

In the specific example that follows, the MEID is AA00A23B1B3D56 and the check digit is not known. The first step is to double every other digit, starting with the first digit on the right and working to the left. The following table shows this step (from A+(1+4)+0+0+A+4+3+(1+6)+1+(1+6)+3+(1+A)+5+C):

| | | | | MEID (Hexadecimal) | | | | | | | | | CD |
|---|---|---|---|---|---|---|---|---|---|---|---|---|---|
| A | A | 0 | 0 | A | 2 | 3 | B | 1 | B | 3 | D | 5 | 6 |
| A | 5 | 0 | 0 | A | 4 | 3 | 7 | 1 | 7 | 3 | B | 5 | C | 2 |

4E (hexadecimal) is the sum of all numbers. Rounding up 4E to the next highest denominator of 16 (0x10) gets 50. Subtracting the 4E from 50 leaves 2 (this is all in hexadecimal). So the check digit must be 2. The resulting hexadecimal MEID, with check digit, would be: AA00A23B1B3D562.

To verify the check digit in an MEID, one begins with the second digit from the right and doubles every other digit working toward the left. The following are examples of verifying the validity of the check digit, which is the last number on the right. Assume the number in question is A7B6C. Begin with the second to last digit and double it, and then every other digit going to the left. A7B6C becomes AEBCC. Now add these digits up A+E+B+C+C=3B. This is not a valid number, because the last digit in the final sum does not equal 0. Assume the next number in question is 37ABE. Begin with the penultimate digit from the right and double it, and then every other digit going to the left. 37ABE becomes 3EA7E. Now add these digits up 3+E+A+7+E=30. This is a valid number, because the last digit in the final sum is 0.

All numbers that have a check digit, when run through this algorithm, must end in 0 to be considered valid. The above example, AA00A23B1B3D562, becomes 50 when placed into the Luhn Algorithm, base 16. The final sum ends in 0, so it is a valid number.

A pseudo electronic serial number (pESN) is a 32 bit number derived from the hexadecimal MEID and used in place of the ESN. The high order 8 bits are always 0x80 and the remaining 24 bits are derived using the Secure Hash Algorithm-1 (SHA-1). The SHA-1 will report back a 160 bit hexadecimal number. The least significant 24 bits are used in the creation of the pESN.

The SHA-1 is an algorithm that is used for security applications. This algorithm is used by many industries and the government. A "free" SHA-1 calculator application is publicly available at http://www.slavasoft.com/hashcalc/. This calculator contains 12 different popular algorithms, just uncheck all but the SHA-1 for this application. You must use the "Hex string" for the Data Format in order to generate the correct value. The "Text string" will result in a different value and should not be used.

The first 8 bits of the pESN will always be "1000 0000". In hexadecimal this equates to "80". The final 24 bits are derived from the SHA-1 calculation of the 14 character MEID. The MEID used must be hexadecimal format to work properly. With the 24 bits from the SHA-1 calculation, concatenating the first 8 bits to the last 24 bits, reveals a 32 bit word. This 32 bit word is transmitted as an ESN in systems that have not yet implemented MEID. The handset creates the pESN for systems that do not yet support MEID. The probability of ESN conflicts exists, but is initially minimal. However, system operators are working toward advancing their systems to accept MEID enabled handsets. As more handsets with MEID are distributed, the likelihood of ESN conflicts on non-MEID systems increases.

The following is an example of pESN creation. Assume the handset has Hexadecimal MEID=AA00A23B1B3D562. To convert this into a pESN, first remove the check digit. In this case the "2" in the least most significant location is removed giving the following number: AA00A23B1B3D56. Placing this number into the SHA-1 calculator returns the 160 bit number: 07E55AF782F0AA344EB66721F2968FE81C8F9102. Taking the least significant 24 bits from the SHA-1 calculator, 8F9102, and concatenating the hexadecimal number 80 to the front of the 24 bit number from above, gives the 32 bit hexadecimal pseudo ESN: 808F9102.

The hexadecimal pESN number format can have the appearance of an 8 alpha numeric character number with the following format:

| TIA | | Serial Number | | | | | |
|---|---|---|---|---|---|---|---|
| T | T | S | S | S | S | S | S | wherein TT will always have the value of 80 hexadecimal, SSSSSS has a valid range from 000000 to FFFFFF and a maximum allowed value of FFFFFF. The same rules from the ESN section above, will apply to the pESN for the conversion from hexadecimal to decimal.

The following table shows 96 examples (for testing purposes). Each row is mathematically equivalent according to the rules of each serial number as defined in this document.

| MEID w/CD (hexadecimal) | MEID w/CD (decimal) | pESN (hexadecimal) | pESN (decimal) |
|---|---|---|---|
| A00000001000013 | 2684354560010485779 | 80664860 | 12806703200 |
| A00000001000021 | 2684354560010485787 | 80996CA9 | 12810054825 |
| A0000000100003F | 2684354560010485795 | 80E9219B | 12815278491 |
| A0000000100004D | 2684354560010485804 | 807DA638 | 12808234552 |
| A0000000100005B | 2684354560010485812 | 809F91FD | 12810457597 |
| A00000001000069 | 2684354560010485820 | 80F74ADB | 12816206555 |
| A00000001000077 | 2684354560010485838 | 80C421BB | 12812853691 |
| A00000001000084 | 2684354560010485846 | 803290D0 | 12803313872 |
| A00000001000092 | 2684354560010485853 | 80E2112B | 12814815531 |
| A000000010000A0 | 2684354560010485861 | 80B221A4 | 12811674020 |
| A000000010000BE | 2684354560010485879 | 80CC22D0 | 12813378256 |
| A000000010000CC | 2684354560010485887 | 80EFA918 | 12815706392 |
| A000000010000DA | 2684354560010485895 | 80B21A5E | 12811672158 |
| A000000010000E8 | 2684354560010485904 | 80974707 | 12809914119 |
| A000000010000F6 | 2684354560010485912 | 80CED048 | 12813553736 |
| A00000001000104 | 2684354560010485920 | 80B394CE | 12811769038 |
| A00000001000112 | 2684354560010485938 | 809607DC | 12809832412 |
| A00000001000120 | 2684354560010485946 | 8041878E | 12804294542 |
| A0000000100013E | 2684354560010485953 | 800E6B20 | 12800944928 |
| A0000000100014C | 2684354560010485961 | 80F90461 | 12816319585 |
| A0000000100015A | 2684354560010485979 | 80D1A8AD | 12813740205 |
| A00000001000168 | 2684354560010485987 | 8070D570 | 12807394672 |
| A00000001000176 | 2684354560010485995 | 80801A33 | 12808395315 |
| A00000001000183 | 2684354560010486002 | 800E74DB | 12800947419 |
| A00000001000191 | 2684354560010486010 | 80008574 | 12800034164 |
| A000000010001AF | 2684354560010486028 | 80AE0B48 | 12811406152 |
| A000000010001BD | 2684354560010486036 | 80A5790D | 12810844429 |
| A000000010001CB | 2684354560010486044 | 80A9CE49 | 12811128393 |
| A000000010001D9 | 2684354560010486051 | 8079D1C3 | 12807983555 |
| A000000010001E7 | 2684354560010486069 | 8060BC09 | 12806339593 |
| A000000010001F5 | 2684354560010486077 | 805AEF4D | 12805959501 |
| A00000001000203 | 2684354560010486085 | 8099482E | 12810045486 |
| A00000001000211 | 2684354560010486093 | 80445444 | 12804478020 |
| A0000000100022F | 2684354560010486102 | 80ABDB58 | 12811262808 |
| A0000000100023D | 2684354560010486110 | 80E9B22B | 12815315499 |
| A0000000100024B | 2684354560010486128 | 805E156A | 12806165866 |
| A00000001000259 | 2684354560010486136 | 80752639 | 12807677497 |

-continued

| MEID w/CD (hexadecimal) | MEID w/CD (decimal) | pESN (hexadecimal) | pESN (decimal) |
|---|---|---|---|
| A00000001000267 | 2684354560010486144 | 80846262 | 12808675938 |
| A00000001000275 | 2684354560010486151 | 80B0893A | 12811569466 |
| A00000001000282 | 2684354560010486169 | 80716AFE | 12807432958 |
| A00000001000290 | 2684354560010486177 | 8093103B | 12809637947 |
| A0000000100002AE | 2684354560010486185 | 80361935 | 12803545397 |
| A0000000100002BC | 2684354560010486193 | 8088B542 | 12808959298 |
| A0000000100002CA | 2684354560010486202 | 80E24243 | 12814828099 |
| A0000000100002D8 | 2684354560010486210 | 80DD34D7 | 12814496983 |
| A0000000100002E6 | 2684354560010486228 | 80C5C893 | 12812961939 |
| A0000000100002F4 | 2684354560010486236 | 807126FB | 12807415547 |
| A00000001000302 | 2684354560010486244 | 80465B02 | 12804610818 |
| A00000001000310 | 2684354560010486251 | 80D52F62 | 12813971298 |
| A0000000100032E | 2684354560010486269 | 80361970 | 12803545456 |
| A0000000100033C | 2684354560010486277 | 80F285DF | 12815893983 |
| A0000000100034A | 2684354560010486285 | 80FB5C13 | 12816473107 |
| A00000001000358 | 2684354560010486293 | 803E843F | 12804097087 |
| A00000001000366 | 2684354560010486302 | 807E4E6D | 12808277613 |
| A00000001000374 | 2684354560010486310 | 800B8F31 | 12800757553 |
| A00000001000381 | 2684354560010486328 | 80177D00 | 12801539328 |
| A0000000100039F | 2684354560010486336 | 8036241C | 12803548188 |
| A000000010003AD | 2684354560010486344 | 80CB6FCA | 12813332426 |
| A000000010003BB | 2684354560010486351 | 8043985A | 12804429914 |
| A000000010003C9 | 2684354560010486369 | 80F304A7 | 12815926439 |
| A000000010003D7 | 2684354560010486377 | 80B9541E | 12812145694 |
| A000000010003E5 | 2684354560010486385 | 80D3298D | 12813838733 |
| A000000010003F3 | 2684354560010486393 | 8014DF11 | 12801367825 |
| A00000001000401 | 2684354560010486402 | 80E5EE3D | 12815068733 |
| A0000000100041F | 2684354560010486410 | 80507FC9 | 12805275593 |
| A0000000100042D | 2684354560010486428 | 8023D53D | 12802348349 |
| A0000000100043B | 2684354560010486436 | 80503174 | 12805255540 |
| A00000001000449 | 2684354560010486444 | 801B70B9 | 12801798329 |
| A00000001000457 | 2684354560010486451 | 80146114 | 12801335572 |
| A00000001000465 | 2684354560010486469 | 80F5F17E | 12816118142 |
| A00000001000473 | 2684354560010486477 | 80455CB4 | 12804545716 |
| A00000001000480 | 2684354560010486485 | 80F8217F | 12816261503 |
| A0000000100049E | 2684354560010486493 | 8062A5EF | 12806465007 |
| A000000010004AC | 2684354560010486502 | 80FD7F30 | 12816613168 |
| A000000010004BA | 2684354560010486510 | 80F12FEF | 12815806447 |
| A000000010004C8 | 2684354560010486528 | 808AD34C | 12809098060 |
| A000000010004D6 | 2684354560010486536 | 801340CE | 12801261774 |
| A000000010004E4 | 2684354560010486544 | 80E5C657 | 12815058519 |
| A000000010004F2 | 2684354560010486551 | 801454CD | 12801332429 |
| A00000001000500 | 2684354560010486569 | 806C67CA | 12807104458 |
| A0000000100051E | 2684354560010486577 | 80C25F01 | 12812738305 |
| A0000000100052C | 2684354560010486585 | 80D19289 | 12813734537 |
| A0000000100053A | 2684354560010486593 | 80549C08 | 12805544968 |
| A00000001000548 | 2684354560010486602 | 80949F03 | 12809740035 |
| A00000001000556 | 2684354560010486610 | 800EDAC5 | 12800973509 |
| A00000001000564 | 2684354560010486628 | 803CE751 | 12803991377 |
| A00000001000572 | 2684354560010486636 | 807D8C79 | 12808227961 |
| A0000000100058F | 2684354560010486644 | 80BCCF63 | 12812373859 |
| A0000000100059D | 2684354560010486651 | 804C8911 | 12805015825 |
| A000000010005AB | 2684354560010486669 | 807F2B18 | 12808334104 |
| A000000010005B9 | 2684354560010486677 | 8027C44F | 12802606159 |
| A000000010005C7 | 2684354560010486685 | 8096CDEF | 12809883119 |
| A000000010005D5 | 2684354560010486693 | 80F1994D | 12815833421 |
| A000000010005E3 | 2684354560010486702 | 80D65726 | 12814047014 |
| A000000010005F1 | 2684354560010486710 | 80D63B2B | 12814039851 |

The IMEI is composed of 14 decimal digits and is used in the GSM technology. A check sum digit is placed at the end, but is neither used in the calculations nor transmitted. The current IMEI may have a 2 digit number attached to the end of the IMEI. This would be the Software Version Number (SVN) that will be transmitted over the air, but is not used in the calculations.

Prior to April 2004 the IMEI consisted of a Type Approval Code (TAC), a Final Assembly Code (FAC) and a Serial Number (SNR). The Check Digit (CD) is located in the least most significant location of the overall number. Since April 2004 the IMEI received an update to the digit format of the number. The new format contains a TAC and an SNR, along with a CD. There are three (3) classifications of IMEI codes: White—approved units; Gray—units that are being watched or tracked; and Black—units that are not allowed on the operator network.

Prior to April 2004, the IMEI number had the appearance of a 14 digit number with the following format:

| TAC | | | | | | FAC | | Serial Number | | | | | CD |
|---|---|---|---|---|---|---|---|---|---|---|---|---|---|
| T | T | T | T | T | T | F | F | S | S | S | S | S | C | wherein TTTTTT has a valid range from 000001 to 999999 and a maximum allowed value of 999999, FF has a valid range from 00 to 99 and a maximum allowed value of 99, SSSSSS has a valid range from 000000 to 999999 and a maximum allowed value of 999999, and the check digit C has a valid range of 0-9. The check digit is not used in the IMEI calculations, and is not transmitted. The TAC was the approval code for the country in which the approval was sought. The final assembly code was the manufacturer of the unit and the serial number was the manufacturer supplied unique identifying number for the unit. The check digit was derived from the TAC, FAC and SNR.

Since April 2004, the IMEI is a 14 digit number with the following format:

| TAC | | | | | | | | Serial Number | | | | | CD |
|---|---|---|---|---|---|---|---|---|---|---|---|---|---|
| T | T | T | T | T | T | T | T | S | S | S | S | S | C | wherein TTTTTTTT has a valid range from 00000001 to 99999999 and a maximum allowed value of 99999999, SSSSSS has a valid range from 000000 to 999999 and a maximum allowed value of 999999, and the check digit C has a valid range of 0-9. The check digit is derived from the TAC and SNR. It is appended to the end of the IMEI and is neither transmitted nor used in any other calculations. The TAC, along with the manufacturer code, is the approval code for the country in which the approval was sought. The serial number is the manufacturer supplied unique identifying number for the unit.

As shown in the flowchart of FIG. 1, in one embodiment the method can be used to convert a MEID number from a hexadecimal format to a decimal format. In the first step 10, the user is prompted to enter the known hexadecimal MEID. In the next step 20 the embodiment determines if the entered MEID has fourteen digits. If the MEID does not have fourteen digits, the embodiment will determine if the MEID has fifteen digits 30. If the MEID has neither fourteen nor fifteen digits, the embodiment reports that the MEID is invalid 40.

If the MEID has fifteen digits, the next step 50 is calculation of the Luhn algorithm. In the next step 60 the embodiment determines if the result ends with a zero. If the result does not end with a zero, the embodiment will report that the MEID is invalid. If the result does end with a zero the embodiment will report that the MEID is valid 70 and truncate the check digit from the MEID 80.

If the MEID was entered with fourteen digits 20, or if it was a entered as a valid fifteen-digit MEID and has been truncated 80, two series of steps will occur. In one series, the MEID will be reported in the verification field 90. Next the Luhn algorithm is calculated in base 16 to obtain the check digit 100, and the check digit is reported 110. In the next step the hexadecimal MEID and the check digit are concatenated 120, and the final value of the hexadecimal MEID with check digit is displayed 130.

In the other series, the MEID is converted into hexadecimal 140, and the decimal MEID is reported 150. Next the Luhn algorithm is calculated in base 10 to obtain the check digit 160, and the check digit is reported 170. Finally, the decimal MEID and check digit are concatenated 180, and the final value of the decimal MEID with check digit is displayed 190.

A valid hexadecimal MEID with check digit may be entered into a spreadsheet as shown in FIG. 2, according to one embodiment of the present invention. When a valid hexadecimal MEID with check digit have been entered 200, the embodiment will identify the number format and validate the MEID and check digit. The embodiment will display a truncated hexadecimal MEID 210 in one column with the check digit 220 in another column. The embodiment will also display the concatenated hexadecimal MEID with check digit 230.

The embodiment will calculate and display the decimal MEID 240 as well as the decimal MEID check digit 250. The embodiment will also display the concatenated decimal MEID and check digit 260.

The embodiment displays that the hexadecimal MEID entered is valid 270, and further displays that the MEID with check digit is valid 280.

A valid hexadecimal MEID without check digit may be entered into a spreadsheet as shown in FIG. 3, according to one embodiment of the present invention. When a valid hexadecimal MEID has been entered but with no check digit 290, the embodiment will identify the number format, and validate the MEID and calculate the check digit. The embodiment will display a truncated hexadecimal MEID 300 in one column with the check digit 310 in another column. The embodiment will also display the concatenated hexadecimal MEID with check digit 320.

The embodiment will calculate and display the decimal MEID 330 as well as the decimal MEID check digit 340. The embodiment will also display the concatenated decimal MEID and check digit 350.

The embodiment displays that either the MEID entered is not valid or else no check digit was entered 370. As shown in FIG. 3, there was no check digit entered. However, the MEID entered was valid as is shown by the additional embodiment display verifying the MEID validity 360.

A hexadecimal MEID that has too many digits (and is thus invalid) may be entered into a spreadsheet as shown in FIG. 4, according to one embodiment of the present invention. When a MEID that has too many digits has been entered 380, the embodiment will identify the invalidity of the entered MEID. The embodiment will display that either the MEID entered is not valid or else does not have a check digit 400, and will further display that there were too many or not enough digits entered 390.

A hexadecimal MEID that has too few digits (and is thus invalid) may be entered into a spreadsheet as shown in FIG. 5, according to one embodiment of the present invention. When a MEID that has too few digits has been entered 410, the embodiment will identify the invalidity of the entered MEID. The embodiment will display that either the MEID entered is not valid or else does not have a check digit 430, and will further display that there were too many or not enough digits entered 420.

Columns A and B of one spreadsheet embodiment are shown in FIG. 6. These columns contain some of the formulas for performing necessary validations and conversions according to this embodiment of the present invention. The embodiment displays the user-entered hexadecimal MEID 440. The embodiment further shows spreadsheet functions for converting a hexadecimal number to a decimal 450 and for converting a decimal number to a hexadecimal 460.

The figures following FIG. 6 show additional columns of the spreadsheet of FIG. 6: FIG. 7 shows columns C, D and E; FIG. 8 shows columns F, G and H; FIG. 9 shows columns I, J and K; FIG. 10 shows columns L, M and N; FIG. 11 shows columns O, P, Q and R; FIG. 12 shows columns S, T and U; FIG. 13 shows column V; FIG. 14 shows columns W and X; FIG. 15 shows column Y; and FIG. 16 shows columns Z and AA.

EXAMPLES

The following examples depict portions of one possible application used to implement the inventive systems. While these applications are particularly suited for the invention, these are not the only suitable embodiments contemplated by the invention and what is claimed.

Example 1

In one embodiment, the invention can be used manually or automatically by personnel in a call center, repair center, or retail environment to validate MEID numbers or convert them before entering using the number to perform such acts as activating a wireless communication device, validating a customer's account, and the like.

Example 2

An alternative embodiment of the invention is used in assigning and/or verifying numbers by manufacturers and/or distributors, validating numbers in programming, kitting, distributing, selling or handling returns of the wireless communication devices.

Example 3

Another embodiment of the invention can be used to recognize wireless communication devices in switching wireless communication networks. For example, a wireless network provider may want to use the present invention in conjunction with existing systems to validate an MEID number prior to allowing the wireless communication device to connect to the network.

Example 4

An additional embodiment can be embedded in a wireless communication device itself. If the invention is embedded, the wireless communication device can provide the number in any format via wireless communication, data transfer port, or a display, and so on.

Example 5

Yet another embodiment may be embedded in a handheld conversion unit. A handheld conversion unit may include a display, a hexadecimal or other numeric system keypad, a bar code scanner, and a display. The user can scan a number such as an MEID (or type the MEID into a data entry device) and immediately retrieve all other useful equivalent representations of the number as well as a validation confirmation.

The metes and bounds of the invention are not to be limited by the foregoing disclosure, which is illustrative only, but should be determined in accordance with the full scope and spirit of the appended claims. The invention is described above with reference to non-limiting specific examples and embodiments provided for illustrative purposes only.

The invention claimed is:

1. A method of validating and converting a wireless communication device identification number comprising: receiving a wireless communication device identification number from a device selected from the group consisting of: a bar code scanner, a keypad, a data transfer port, a display; converting the wireless communication device identification number to an equivalent representation; validating the wireless communication device identification number and said equivalent representation; and transmitting the equivalent representation, wherein the wireless communication device identification number includes a mobile equipment identifier (MEID), wherein each of the wireless communication device identification number and said equivalent representation includes a check digit determined by a predefined mathematical algorithm, and the validating step includes verifying the check digit for each of the received wireless communication device identification number and said equivalent representation.

2. The method of claim 1 wherein the transmitting of the equivalent representation is via display screen.

3. The method of claim 1 wherein the transmitting is by a device selected from the group consisting of: a software link, a data transfer port, an electronic link, a computer monitor, a printer, a TCP/IP protocol, an XML protocol.

4. A system for validating and converting a wireless communication device identification number comprising: a means for receiving a wireless communication device identification number; a means for converting the wireless communication device identification number to an equivalent representation; a means for validating the wireless communication device identification number and its equivalent representation; and a means for communicating the equivalent representation, wherein the wireless communication device identification number includes a mobile equipment identifier (MEID), wherein each of the wireless communication device identification number and the equivalent representation includes a check digit determined by a predefined mathematical algorithm, and the means for validating includes means for verifying the check digit for each of the received wireless communication device identification number and the equivalent representation.

5. The system of claim 4 wherein the means for receiving a wireless communication identification number is a device selected from the group consisting of: a bar code scanner, a data transfer port, a display, a keypad.

6. The system of claim 4 wherein the means for communicating the equivalent representation is a device selected from the group consisting of: a software link, a data transfer port, an electronic link, a computer monitor, a printer, a TCP/IP protocol, an XML protocol.

7. The system of claim 4 wherein the means for communicating the equivalent representation is a display screen.

8. A device comprising a non-transitory computer-readable medium, said computer-readable medium containing computer executable code for validating and converting a wireless communication device identification number wherein: said computer executable code is configured to validate and convert said wireless communication device identification number according to a method comprising the steps of: receiving a wireless communication device identification number; converting the wireless communication device identification number into an equivalent representation; and outputting the equivalent representation of the wireless communication device identification number; and validating the wireless communication device identification number and the equivalent representation, wherein the wireless communication device identification number includes a mobile equipment identifier (MEID), wherein each of the wireless communication device identification number and the equivalent representation includes a check digit determined by a predefined mathematical algorithm, and the validating step includes verifying the check digit for each of the received wireless communication device identification number and the equivalent representation.

9. The device of claim 8 wherein the wireless communication device identification number is in hexadecimal format.

10. The device of claim 9 wherein the equivalent representation of the wireless communication device identification number is in decimal format.

11. The device of claim 9 wherein the output of the equivalent representation of the wireless communication identification number is to a device selected from the group consisting of: a software link, a data transfer port, an electronic link, a computer monitor, a printer, a TCP/IP protocol, an XML protocol, a display screen.

12. The device of claim 9 wherein the output of the equivalent representation of the wireless communication identification number is via a software link.

13. The device of claim 8 wherein the wireless communication device identification number is in decimal format and the equivalent representation of the wireless communication device identification number is in hexadecimal format.

14. The device of claim 13 wherein the output of the equivalent representation of the wireless communication identification number is to a device selected from the group consisting of: a software link, a data transfer port, an electronic link, a computer monitor, a printer, a TCP/IP protocol, an XML protocol, a display screen.

15. A method of determining and converting number format type of a wireless communication device identification number comprising:
receiving a wireless communication device identification number from a device selected from the group consisting of: a bar code scanner, a keypad, a data transfer port, a display;
determining the type of number format of the wireless communication identification number;
automatically converting the wireless communication device identification number to an equivalent representation;
validating the wireless communication device identification number and said equivalent representation; and
transmitting the equivalent representation, wherein the wireless communication device identification number includes a mobile equipment identifier (MEID), wherein each of the wireless communication device identification number and said equivalent representation includes a check digit determined by a predefined mathematical algorithm, and the validating step includes verifying the check digit for each of the received wireless communication device identification number and said equivalent representative.

16. The method of claim 15 wherein the converting is performed by software instructions.

17. The method of claim 15 wherein the wireless communication device identification number comprises a Mobile Equipment Identifier (MEID).

18. The method of claim 15 wherein the received wireless communication device identification number is in hexadecimal format and the equivalent representation of the wireless communication device identification number is in decimal format.

19. The method of claim 15 wherein the received wireless communication device identification number is in decimal format and the equivalent representation of the wireless communication device identification number is in hexadecimal format.

20. The method of claim 15, wherein the predefined mathematical algorithm is a Luhn algorithm.

* * * * *

UNITED STATES PATENT AND TRADEMARK OFFICE
CERTIFICATE OF CORRECTION

| | | |
|---|---|---|
| PATENT NO. | : 8,503,971 B2 | Page 1 of 1 |
| APPLICATION NO. | : 11/465086 | |
| DATED | : August 6, 2013 | |
| INVENTOR(S) | : Terry A. Overby | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1195 days.

Signed and Sealed this
Twenty-fourth Day of February, 2015

Michelle K. Lee
*Deputy Director of the United States Patent and Trademark Office*